(12) United States Patent
Becker et al.

(10) Patent No.: US 10,074,274 B2
(45) Date of Patent: Sep. 11, 2018

(54) EMERGENCY SIGNAL DETECTION AND RESPONSE

(71) Applicant: Faraday & Future Inc., Gardena, CA (US)

(72) Inventors: Jan Becker, Palo Alto, CA (US); Veera Ganesh Yalla, Sunnyvale, CA (US); Chongyu Wang, San Jose, CA (US); Bibhrajit Halder, Sunnyvale, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 12 days.

(21) Appl. No.: 15/445,979

(22) Filed: Feb. 28, 2017

(65) Prior Publication Data
US 2017/0249839 A1 Aug. 31, 2017

Related U.S. Application Data

(60) Provisional application No. 62/301,444, filed on Feb. 29, 2016, provisional application No. 62/368,966, filed on Jul. 29, 2016.

(51) Int. Cl.
*G08G 1/0967* (2006.01)
*G08G 1/0965* (2006.01)
(Continued)

(52) U.S. Cl.
CPC ..... *G08G 1/096725* (2013.01); *G08G 1/0965* (2013.01); *G01S 19/17* (2013.01)

(58) Field of Classification Search
CPC ............ G08G 1/096725; G08G 1/0965; G01S 19/17; G01S 19/51; G01S 5/0072; G01C 21/26
(Continued)

(56) References Cited

U.S. PATENT DOCUMENTS 8,612,131 B2 * 12/2013 Gutierrez ........... G01C 21/3691
701/301
8,842,021 B2 * 9/2014 Behm ................... G08G 1/0965
340/426.16
(Continued)

OTHER PUBLICATIONS

Fernández, C. et al. (Oct. 23, 2012). "Autonomous Navigation and Obstacle Avoidance of a Micro-bus," INTECH, International Journal of Advanced Robotic Systems, vol. 10, www.intechopen.com, nine pages.
(Continued)

*Primary Examiner* — Gertrude Arthur Jeanglaude
(74) *Attorney, Agent, or Firm* — Morrison & Foerster LLP

(57) ABSTRACT

This disclosure relates to a method of safely and automatically navigating in the presence of emergency vehicles. A first vehicle may receive, via communication hardware, a message indicating presence of the emergency vehicle. Such a message may originate from the emergency vehicle itself and/or from infrastructure such as a smart traffic light that can sense the presence of the emergency vehicle. The first vehicle may then determine the relative location of the emergency vehicle and automatically respond appropriately by determining a safe trajectory and navigating according to that trajectory until the emergency vehicle is out of range. In some examples, the first vehicle may detect the presence of an emergency vehicle using on-board sensors such as distance measuring sensors, depth sensors, and cameras, in addition to receiving a message via communication hardware.

20 Claims, 19 Drawing Sheets

(51) Int. Cl.
    *B60T 7/12*      (2006.01)
    *G01S 19/17*     (2010.01)

(58) Field of Classification Search
    USPC .......... 701/301, 469, 96; 342/357.34, 357.55
    See application file for complete search history.

(56) References Cited

U.S. PATENT DOCUMENTS

| | | | |
|---|---|---|---|
| 8,993,951 B2 | 3/2015 | Schofield et al. | |
| 9,789,813 B2 | 10/2017 | Gralto | |
| 2008/0085686 A1* | 4/2008 | Kalik | G01S 13/931 455/154.1 |
| 2009/0119014 A1* | 5/2009 | Caplan | G01C 21/26 701/469 |
| 2013/0300871 A1 | 11/2013 | Schofield et al. | |
| 2014/0309806 A1 | 10/2014 | Ricci | |
| 2014/0309864 A1 | 10/2014 | Ricci | |
| 2015/0294422 A1 | 10/2015 | Carver et al. | |
| 2016/0086285 A1 | 3/2016 | Peters et al. | |
| 2017/0075701 A1 | 3/2017 | Ricci et al. | |
| 2017/0140757 A1 | 5/2017 | Penilla et al. | |
| 2017/0200449 A1 | 7/2017 | Penilla et al. | |
| 2017/0205825 A1 | 7/2017 | Wang | |
| 2017/0217421 A1 | 8/2017 | Theodosis | |
| 2017/0248957 A1 | 8/2017 | Delp | |

OTHER PUBLICATIONS

Hautiere, N. et al. (May 20-22, 2009). "Free Space Detection for Autonomous Navigation in Daytime Foggy Weather," MVA2009 IAPR Conference on Machine Vision Applications, pp. 501-504.
Non-Final Office Action dated Mar. 21, 2018, for U.S. Appl. No. 15/418,584, filed Jan. 27, 2017, ten pages.

\* cited by examiner

EMERGENCY SIGNAL DETECTION AND RESPONSE

CROSS-REFERENCE TO RELATED APPLICATION

This application claims the benefit under 35 U.S.C. § 119(e) of U.S. Provisional Application No. 62/301,444, filed Feb. 29, 2016, and U.S. Provisional Application No. 62/368,966, filed Jul. 29, 2016, the entireties of which are hereby incorporated by reference.

FIELD OF THE DISCLOSURE

The present invention relates to detecting and responding to emergency signals, and more particularly to detecting and responding to emergency signals in the vicinity of a vehicle, such as generated by one or more emergency vehicles.

BACKGROUND OF THE DISCLOSURE

Traffic laws in most jurisdictions require vehicle drivers to yield to emergency signals—particularly those emitted by emergency vehicles, like ambulances and police cars that are in the process of responding to an emergency situation. Such traffic laws prioritize access to public roads for emergency vehicles, and allow such emergency vehicles to respond quickly to emergency situations in which minutes or even seconds of traffic delay may mean the difference between life and death. Such emergency vehicles typically make their presence known to drivers by generating emergency signals, such as sirens and flashing lights, that are designed to be seen and heard easily. However, human drivers are fallible and may not notice such emergency signals, particular in high-noise or low-visibility environments that may obscure such emergency signals. Moreover, even a driver who notices an emergency signal may not be able to quickly and effectively locate the source and direction of the emergency signal; or may encounter confusion in determining how best to respond to the emergency signal. The problem of correctly detecting and responding to emergency signals is compounded in the situation of autonomous vehicles. (As used herein, an autonomous vehicle can be one in which one or more driving operations traditionally performed by a human driver may instead be performed by a computer system.) It is an intent of the present invention to enable or augment the ability of a vehicle operator (whether human or autonomous) to safely and reliably detect emergency signals and respond appropriately.

SUMMARY OF THE DISCLOSURE

One or more sensors provide signals representing information about a vehicle's surroundings. These signals are used to detect whether an emergency signal exists in the vicinity of the vehicle, and in some examples, to determine the position and velocity of the source of the emergency signal. In response, one or more output signals are sent to a human or autonomous operator of the vehicle. In some examples, these output signals alert the operator to the presence of the emergency signal, and may further identify the position and velocity of the source of the emergency signal. In some examples, the output signals direct the vehicle operator to take specific action (such as pulling the vehicle to the side of the road) in response to the emergency signal. In some examples, the output signals comprise specific navigation instructions. In this way, the operator of the vehicle can more safely and reliably detect emergency signals and respond appropriately.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

As described above, in some embodiments, one or more sensors provide signals representing information about a vehicle's surroundings. These signals are used to detect whether an emergency signal exists in the vicinity of the vehicle, and in some examples, to determine the position and velocity of the source of the emergency signal. In response, one or more output signals are sent to a human or autonomous operator of the vehicle. In some examples, these output signals alert the operator to the presence of the emergency signal, and may further identify the position and velocity of the source of the emergency signal. In some examples, the output signals direct the vehicle operator to take specific action (such as pulling the vehicle to the side of the road) in response to the emergency signal. In some examples, the output signals comprise specific navigation instructions. In this way, the operator of the vehicle can more safely and reliably detect emergency signals and respond appropriately.

In examples described herein, a vehicle can safely and automatically navigate in the presence of emergency vehicles. A first vehicle may receive, via communication hardware, a message indicating presence of the emergency vehicle. Such a message may originate from the emergency vehicle itself and/or from infrastructure such as a smart traffic light that can sense the presence of the emergency vehicle. The first vehicle may then determine the relative location of the emergency vehicle and automatically respond appropriately by determining a safe trajectory and navigating according to that trajectory until the emergency vehicle is out of range.

Figure 1:
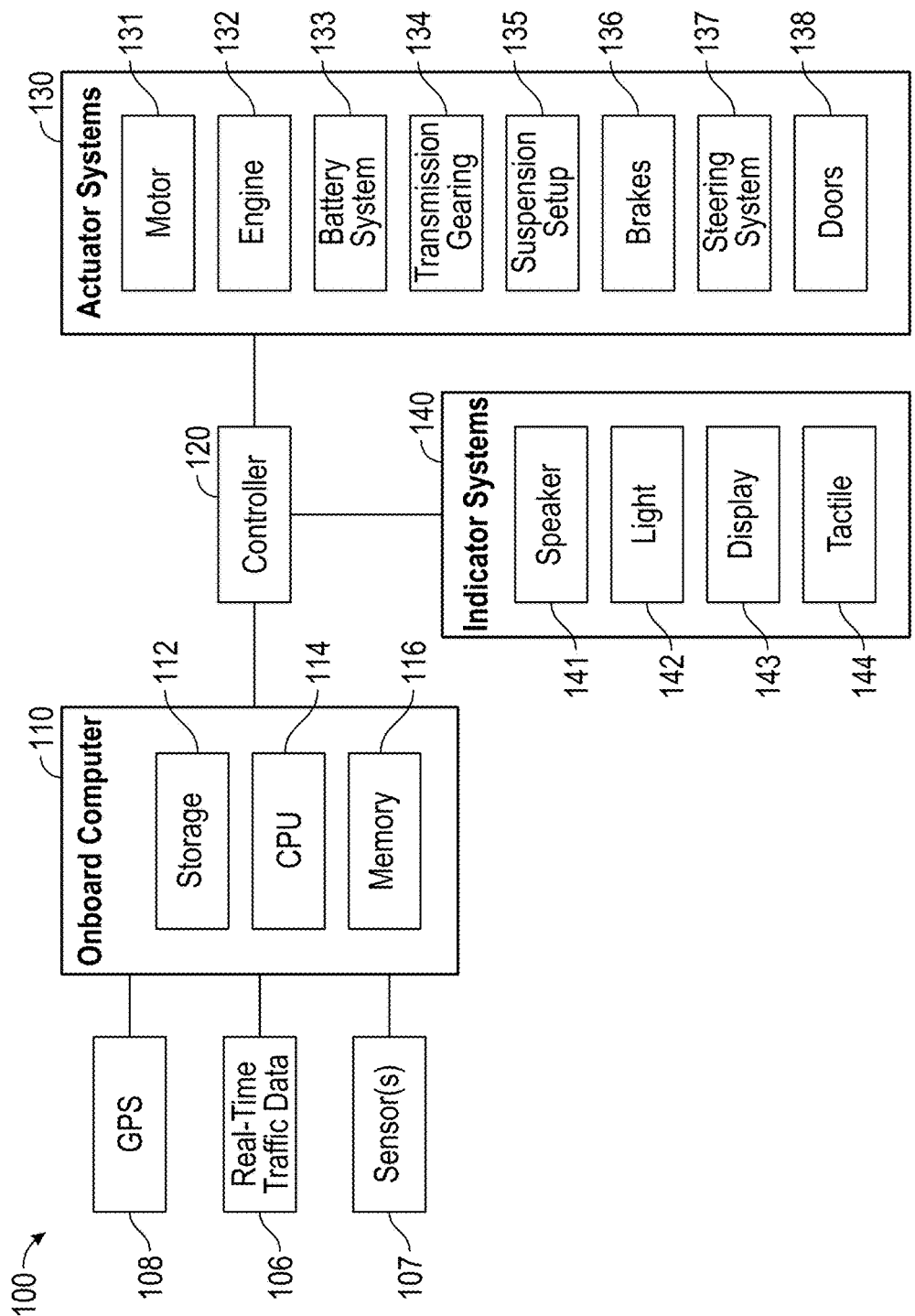
FIG. 1 illustrates a system block diagram of a vehicle control system according to examples of the disclosure.

FIG. 1 illustrates an exemplary system block diagram of vehicle control system 100 according to examples of the disclosure. System 100 can be incorporated into a vehicle, such as a consumer automobile. Other example vehicles that may incorporate the system 100 include, without limitation, airplanes, boats, or industrial automobiles. Vehicle control system 100 can include one or more receivers 106 for real-time data, such as real-time traffic data or emergency broadcast information. Vehicle control system 100 can also include one or more sensors 107 (e.g., microphone, optical camera, radar, ultrasonic, LIDAR, etc.) capable of detecting various characteristics of the vehicle's surroundings, such as the existence of emergency signals and the locations and behaviors of nearby vehicles; and a Global Positioning System (GPS) receiver 108 capable of determining the location of the vehicle. Vehicle control system 100 can include an onboard computer 110 that is coupled to the receivers 106, sensors 107 and GPS receiver 108, and that is capable of receiving data from the receivers 106, sensors 107 and GPS receiver 108. The onboard computer 110 can include storage 112, memory 116, and a processor 114. Processor 114 can perform any of the methods described herein. Additionally, storage 112 and/or memory 116 can store data and instructions for performing any of the methods described herein. Storage 112 and/or memory 116 can be any non-transitory computer readable storage medium, such as a solid-state drive or a hard disk drive, among other possibilities. The vehicle control system 100 can also include a controller 120 capable of controlling one or more aspects of vehicle operation, such as indicator systems 140 and actuator systems 130.

In some examples, the vehicle control system 100 can be connected to (e.g., via controller 120) one or more actuator systems 130 in the vehicle and one or more indicator systems 140 in the vehicle. The one or more actuator systems 130 can include, but are not limited to, a motor 131 or engine 132, battery system 133, transmission gearing 134, suspension setup 135, brakes 136, steering system 137 and door system 138. The vehicle control system 100 can control, via controller 120, one or more of these actuator systems 130 during vehicle operation; for example, to open or close one or more of the doors of the vehicle using the door actuator system 138, or to control the vehicle during autonomous driving (e.g., in response to detection of emergency signals) or parking operations, using the motor 131 or engine 132, battery system 133, transmission gearing 134, suspension setup 135, brakes 136 and/or steering system 137, etc. The one or more indicator systems 140 can include, but are not limited to, one or more speakers 141 in the vehicle (e.g., as part of an entertainment system in the vehicle), one or more lights 142 in the vehicle, one or more displays 143 in the vehicle (e.g., as part of a control or entertainment system in the vehicle) and one or more tactile actuators 144 in the vehicle (e.g., as part of a steering wheel or seat in the vehicle). The vehicle control system 100 can control, via controller 120, one or more of these indicator systems 140 to provide indications to a driver of the vehicle of one or more characteristics of the vehicle's surroundings that are determined using the onboard computer 110, such as the detection of emergency signals in the vehicle's surroundings.

It can be beneficial to use sensors 107 to provide the operator of a vehicle with information about the presence of specific signals in the vicinity of the vehicle. Examples of the disclosure are directed to using one or more sensors attached to a vehicle to detect the presence of emergency signals. Emergency signals may take the form of acoustic signals (e.g. emergency sirens) or visual signals (e.g. red and blue flashing lights). Further, such emergency signals may be emitted by emergency vehicles. However, the present invention is not limited to these particular examples of emergency signals. For example, the present invention includes emergency signals of types (e.g. infrared, ultrasonic) that are not easily detectable by humans, but that could be readily detected by the appropriate sensors. Further, the present invention includes emergency signals that are not emitted by emergency vehicles—for example, a tornado warning siren emitted from a stationary loudspeaker installed in a tornado-prone area.

Figure 2A:
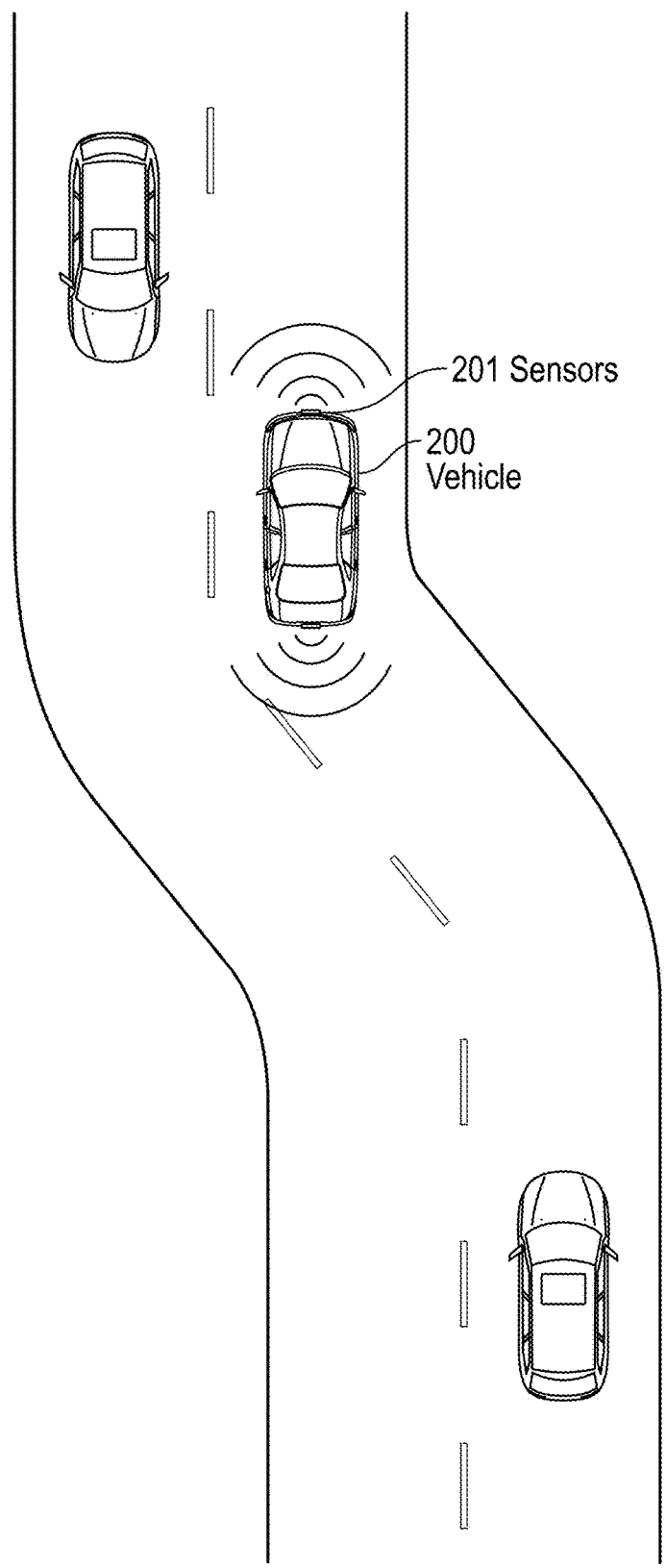
FIG. 2A illustrates an example scenario in which a vehicle includes one or more sensors with no emergency signals in the vicinity, according to examples of the disclosure.

FIG. 2A illustrates exemplary vehicle 200, according to examples of the disclosure, in the absence of an emergency signal. Vehicle 200 includes one or more sensors 201 for providing information about one or more characteristics of the vehicle's surroundings, such as acoustic signals in the vehicle's surroundings; optical signals in the vehicle's surroundings; the locations and/or movements of objects or other vehicles in the vehicle's surroundings; etc. Sensors 201 can include microphones, optical cameras, ultrasonic sensors, laser sensors, radar sensors, LIDAR sensors, or any other sensors that can be used (alone or in combination) to detect one or more characteristics of the vehicle's surroundings. Vehicle 200 can process data, using signal processing techniques known in the art, from one or more of sensors 201 to make a determination about the presence of emergency signals in the vicinity of the vehicle. In the absence of a nearby emergency signal, as in FIG. 2A, vehicle 200 will not conclude from the sensor data that there is an emergency signal in the vicinity of the vehicle.

Figure 2B:
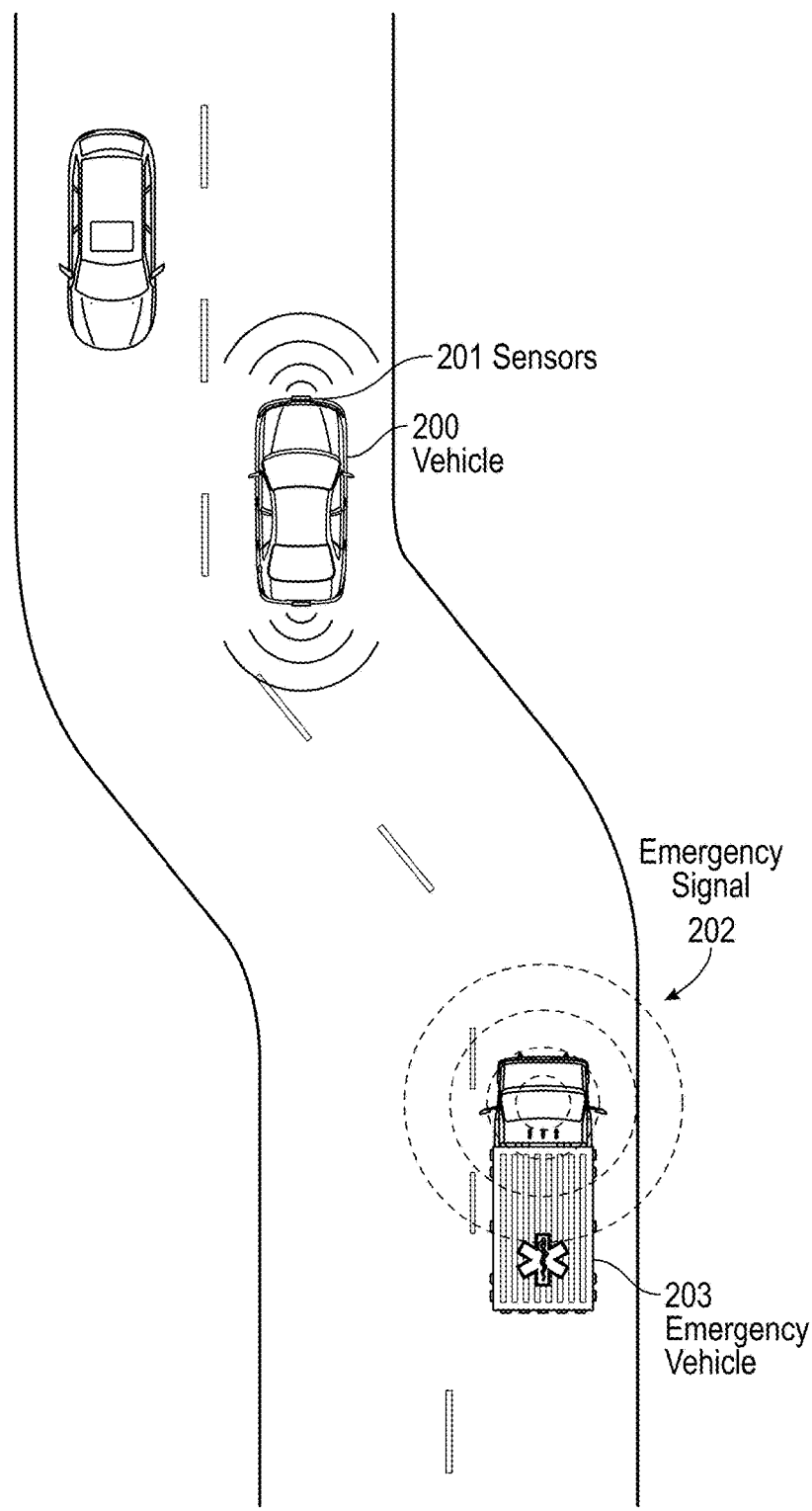
FIG. 2B illustrates an example scenario in which a vehicle includes one or more sensors with an emergency signal in the vicinity, the emergency signal directly detectable by one or more sensors, according to examples of the disclosure.

FIG. 2B illustrates exemplary vehicle 200, according to examples of the disclosure, in the presence of an emergency signal 202 that is directly detectable by one or more sensors 201. Emergency signal 202 may be an audio signal detectable by a microphone (e.g. a siren); an optical signal detectable by an optical camera (e.g. flashing lights); or any other signal (e.g. radio, ultrasonic, etc.) that can be detected by an appropriate sensor. In some examples, multiple emergency signals may be present, for example as in the case of an ambulance that emits both a siren and a flashing light to alert drivers of its presence. In the example shown in FIG. 2B, emergency signal 202 is emitted by emergency vehicle 203. Vehicle 200 can process data from one or more of sensors 201 to make a determination about the likely presence of emergency signals in the vicinity of the vehicle. In FIG. 2B, emergency signal 202 is in the vicinity of vehicle 200, and data from one or more of sensors 201 directly reflects the presence of emergency signal 202; vehicle 200 will therefore conclude from the sensor data that there is an emergency signal in the vicinity of the vehicle.

Various techniques for a vehicle directly determining the presence of an emergency signal from sensor data can be used in the examples of the disclosure. The specific technique or techniques used will depend on the number and type of sensors used and on the types of emergency signal the system is designed to detect, and the present invention is not limited to any particular technique or set of techniques. By way of non-limiting example, the vehicle could use neural network techniques to distinguish sensor data from an environment in which an emergency signal is present from sensor data from an environment in which no emergency signal is present.

It is not necessary that one or more sensors directly detect the emergency signal. The present invention includes making an inference that an emergency signal is in the vicinity of the vehicle based on an indirect detection of the emergency signal by one or more of the sensors. As an example, sensors may detect that the behavior of other vehicles near the vehicle—for example, slowing down and moving to the shoulder of the road—suggests that those vehicles have detected a nearby emergency signal. As another example, sensors may detect a signal from another non-emergency vehicle, or from an emergency broadcast station, the signal communicating that an emergency signal is in the vicinity of the vehicle. In such example cases, the vehicle can determine that an emergency signal is in the vicinity of the vehicle even if its sensors have not directly detected the emergency signal itself.

Figure 2C:
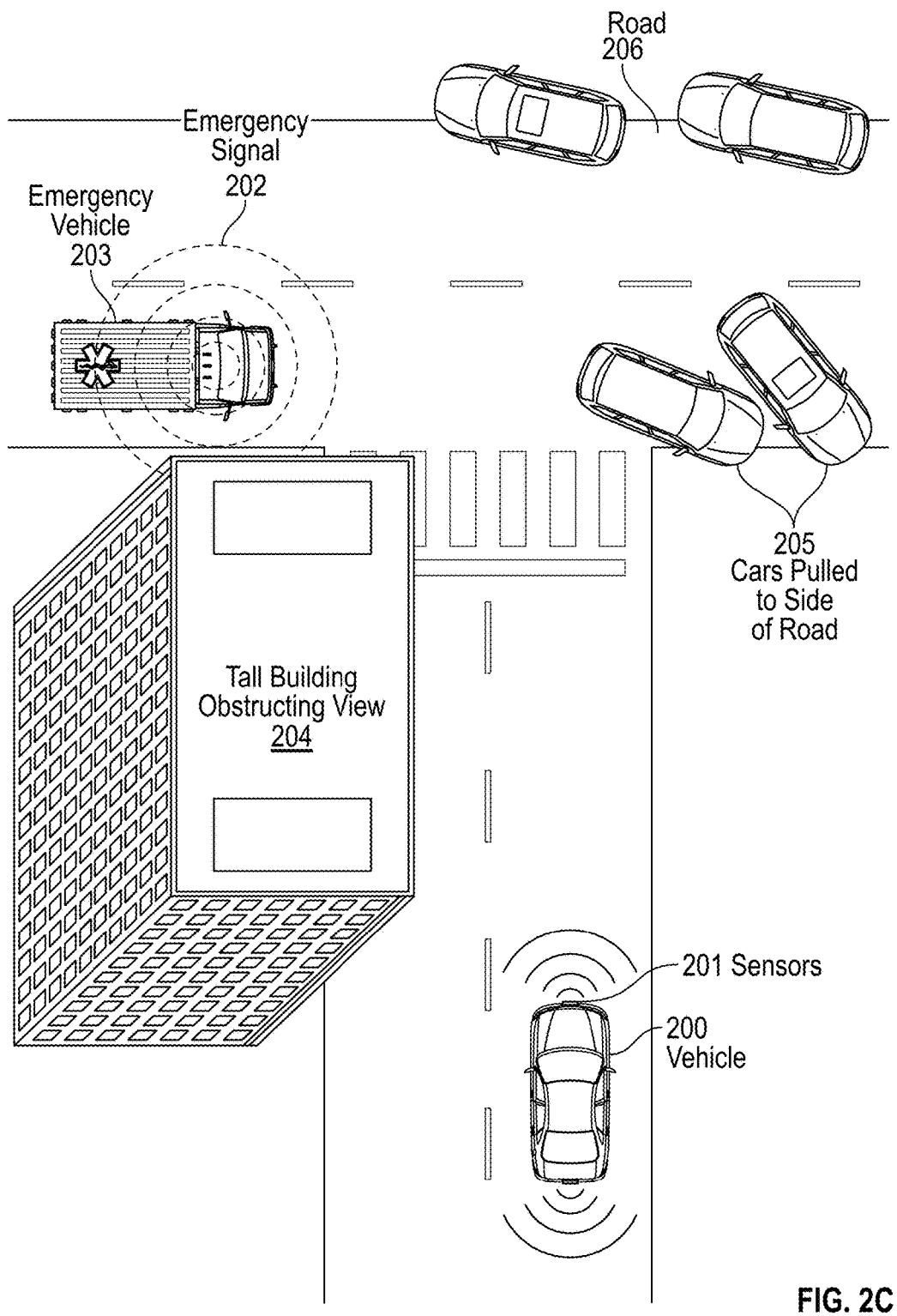
FIG. 2C illustrates an example scenario in which a vehicle includes one or more sensors with an emergency signal in the vicinity, the emergency signal indirectly detectable by one or more sensors, according to examples of the disclosure.

FIG. 2C illustrates exemplary vehicle 200, according to examples of the disclosure, in the presence of an emergency signal 202 that is not directly detectable by one or more sensors 201. In FIG. 2C, emergency signal 202 may be flashing lights, emitted by emergency vehicle 203, that are occluded from view of vehicle 200 by obstacle 204, which may be a wall, a building, or another opaque obstacle. In FIG. 2C, data from one or more sensors 201 may reflect that vehicles 205 are maneuvering to the side of the road 206 in response to emergency signal 202. Vehicle 200 may infer the presence of emergency signal 202 from the behavior of vehicles 205 as reflected in such sensor data, even though emergency signal 202 is not directly detected by one or more sensors 201. Techniques for inferring the presence of a signal (such as an emergency signal) from the observation of other entities, such as vehicles, can include the use of neural networks to teach a system to make such an inference. Other techniques can similarly be used.

In some examples, once an emergency signal is detected, the vehicle attempts to locate the position of the source of the emergency signal. As examples, the source of the emergency signal may be an emergency vehicle, such as an ambulance, or a stationary beacon, such as a tornado warning tower. The vehicle may additionally attempt to identify the speed (a scalar value) or the velocity (a vector having both speed and direction) of the source of the emergency signal. This is beneficial, because knowing the position and velocity of the source may assist the vehicle operator (which may be a computer system, if operating autonomously) in responding to the emergency signal. For example, if the source of the emergency signal is an emergency vehicle that is approaching the vehicle at high speed, the vehicle may need to respond quickly. But if the emergency vehicle is separated from the vehicle by a concrete wall or other barrier, or if the emergency vehicle is traveling in the opposite direction of the vehicle, the vehicle may not need to respond to the emergency signal at all. Various techniques for locating the position of a signal can be used in the examples of the disclosure. For example, the present invention may make use of beamforming, triangulation, or pulse-Doppler radar to locate the source of an emergency signal; and the change in the location of the source during a known time interval can be used to calculate the velocity of the source.

In some examples, map data and/or terrain data may be used in conjunction with geographic coordinates, such as those determined using GPS, to help determine the position and/or velocity of the emergency signal. For example, map data can supply the exact locations of roads on which emergency vehicles emitting emergency signals are likely to travel, and GPS data from an onboard GPS receiver can identify which of those roads are nearby.

In some examples, advance knowledge of the location of emergency facilities such as hospitals, fire stations, and police stations can be used to help determine the position and/or velocity of the emergency signal. For example, ambulances emitting emergency signals tend to travel toward hospitals, and fire trucks emitting emergency signals tend to travel away from fire stations.

In some examples, information received from an emergency broadcast service or emergency information service can be used to help determine the position and/or velocity of the emergency signal. For example, information that a fire is actively burning at a particular nearby location makes it more likely that an emergency vehicle in the area emitting an emergency signal is traveling toward that location.

One or more output signals can be generated in response to detecting an emergency signal in the vicinity of a vehicle. In some examples, the one or more output signals comprise indicator signals such as audio cues, visual cues, and/or tactile cues informing the driver and/or passengers of the sensing vehicle of the emergency signal, and, if known, of the position and velocity of the source of the emergency signal. In some examples, such indicator signals may comprise a visual warning, such as a visual indication on the vehicle's dashboard; an auditory warning sound, such as a warning chime played through the vehicle's dashboard or speaker system; or tactile feedback, such as a motorized vibration of the steering wheel or the vehicle driver's seat. In some examples, the indicator signals may be presented on a mobile device, such as a smartphone. In some examples, indicator signals presented on a mobile device may use the features of the mobile device to attract the user's attention, such as by displaying a visual overlay on the screen of device; presenting a warning tone using the mobile device's audio output; or displaying a text message or multimedia message on the mobile device. The number and character of the indicator signals can depend on factors including, for example, what information is known about the emergency signal; whether the vehicle is human-operated or autonomous; the number of passengers in the vehicle; and whether the vehicle occupants' current environment makes some types of signals more noticeable to the occupants than others. For example, if the driver is in a high-noise environment, an auditory indicator alone may not be sufficient to attract the driver's attention. Additionally, in some examples, multiple indicator signals may be presented simultaneously. For example, the indicator signals may comprise both an audible warning sound and a visual display presented at the same time. As another example, if there are multiple passengers in the vehicle, unique indicator signals may be presented to different passengers.

Figure 3:
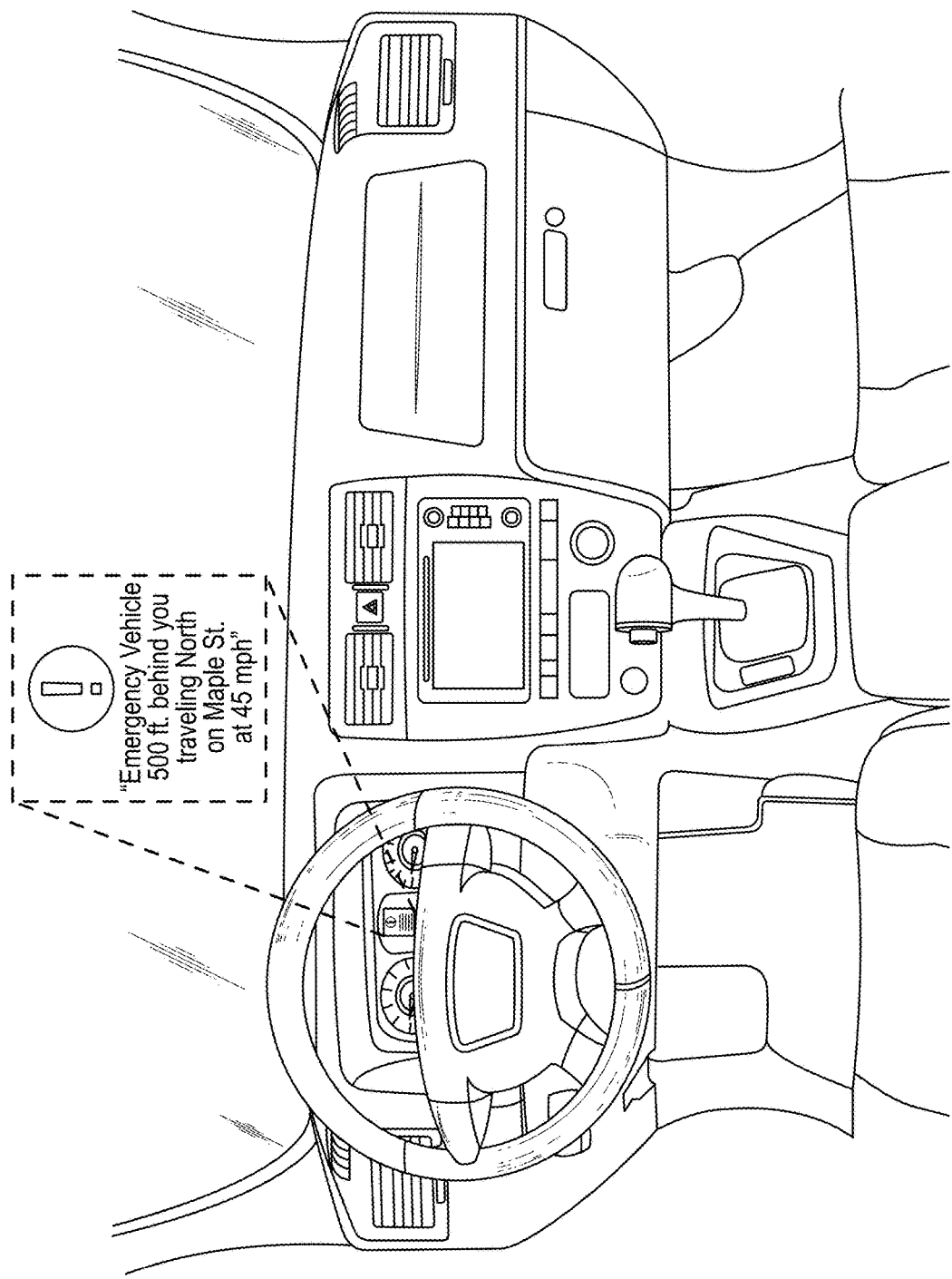
FIG. 3 illustrates an example scenario in which a vehicle dashboard indicates to a vehicle occupant that an emergency signal has been detected and identifies the emergency signal's position and velocity, according to examples of the disclosure.

FIG. 3 illustrates an example scenario in which a vehicle dashboard display 300 presents to a vehicle occupant a visual indicator 301 that an emergency signal has been detected, and presents the position and velocity of the emergency signal.

In some examples, the one or more output signals comprise navigation information to assist in responding to the detected emergency signal. In some examples, the vehicle may determine the geographic coordinates of a nearby location to which to guide the vehicle operator, and generate directions to that location consistent with traffic laws and safety guidelines. In some examples, positional data from an onboard GPS receiver may be used in conjunction with map data or terrain data to generate a route to a safe location. In some examples, positional data from an onboard GPS receiver may be used to identify local laws, speed limits, and current traffic patterns, for example from a database or an online service, which may be then used to optimize the routes generated.

The navigation information may be generated or presented differently depending on whether the vehicle is autonomous or fully human-operated. In some examples in which the vehicle is a human-operated vehicle, there may be no ability to automate or take over operation of the vehicle in response to detecting an emergency signal. In such examples, the navigation information may comprise verbal instructions presented to the driver, such as: continue south on Third Avenue; turn right onto Maple Street; proceed 200 feet; pull to shoulder. These verbal instructions may, for example, be displayed visually on a dashboard display or a heads-up display, or may be spoken to the driver as audio commands. In some examples, the navigation information may comprise visual maps and/or routes presented on a vehicle navigation system display using techniques known in the art.

Figure 4:
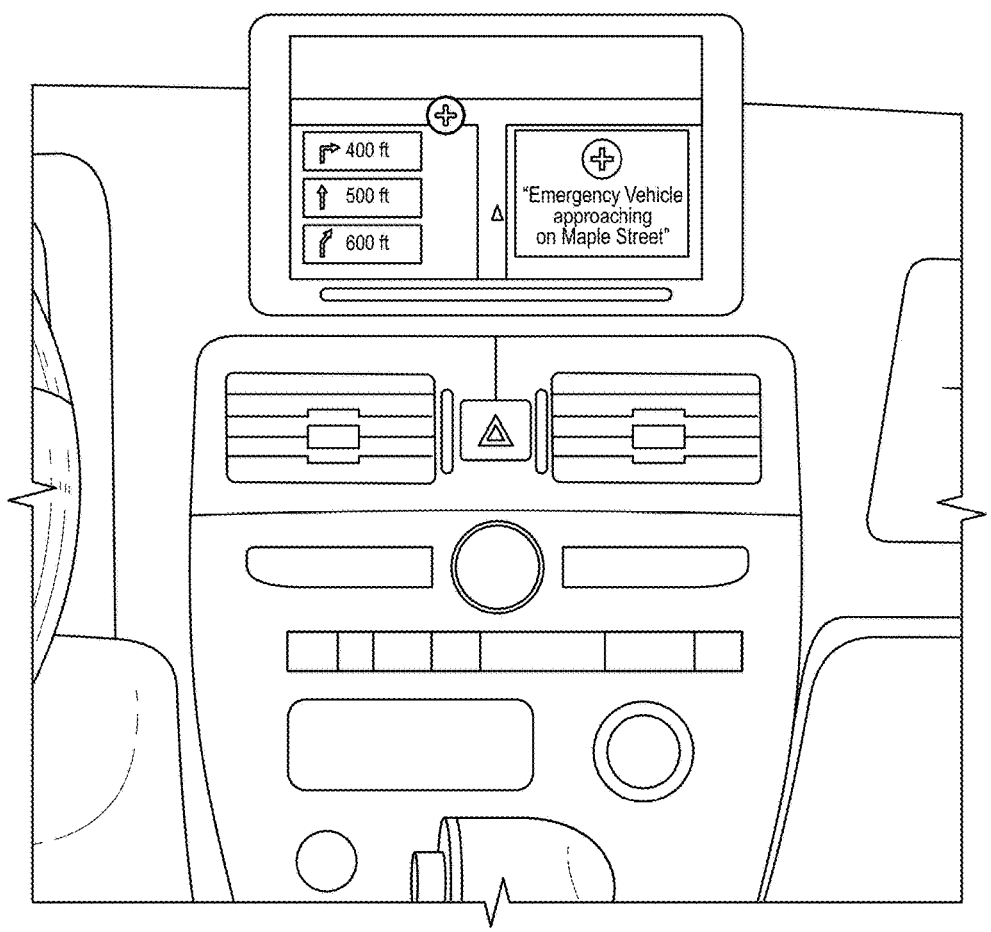
FIG. 4 illustrates an example scenario in which a vehicle navigation system display indicates to a vehicle occupant that an emergency signal has been detected and presents navigation instructions to the driver, according to examples of the disclosure.

FIG. 4 illustrates an example scenario in which a vehicle navigation system display 400 presents to a vehicle occupant a visual indicator 401 that an emergency signal has been detected, and presents to the driver navigation instructions to respond to the emergency signal.

In some examples in which the vehicle is an autonomous vehicle, the navigation information may comprise geographic waypoint coordinates to which a vehicle controller is instructed to navigate, with or without human intervention. Using techniques known in the art, the vehicle controller may then use the waypoint coordinates to compute signals to control, for example, the engine, transmission, brakes, and steering. In some examples in which the vehicle is an autonomous vehicle, the vehicle's response to the emergency signal—for example, slowing down and pulling to the shoulder of the road—can be automated. In some such examples, it is not necessary to present the navigation information to the occupants of the vehicle.

In some examples, machine learning techniques, such as neural networks, that are known to those skilled in the art, are used to optimize or improve the quality of the navigation information. For example, a neural network could be trained to generate optimal navigation information in response to emergency vehicle situations.

Figure 5:
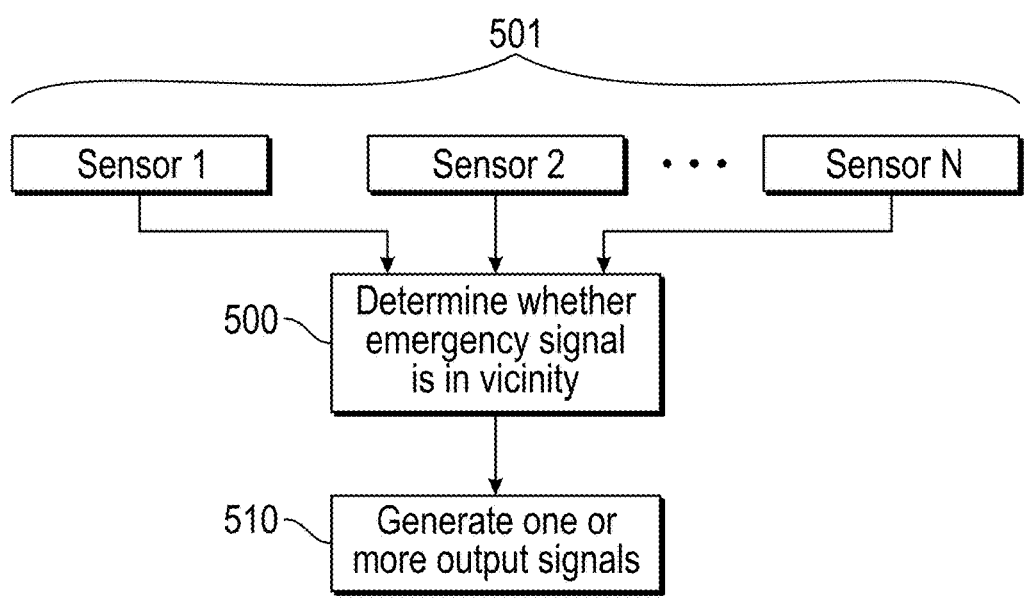
FIGS. 5 and 6 illustrate example processes for determining whether an emergency signal exists in the vicinity of a vehicle, and if an emergency signal so exists, determining how to generate output signals in response.
Figure 6:
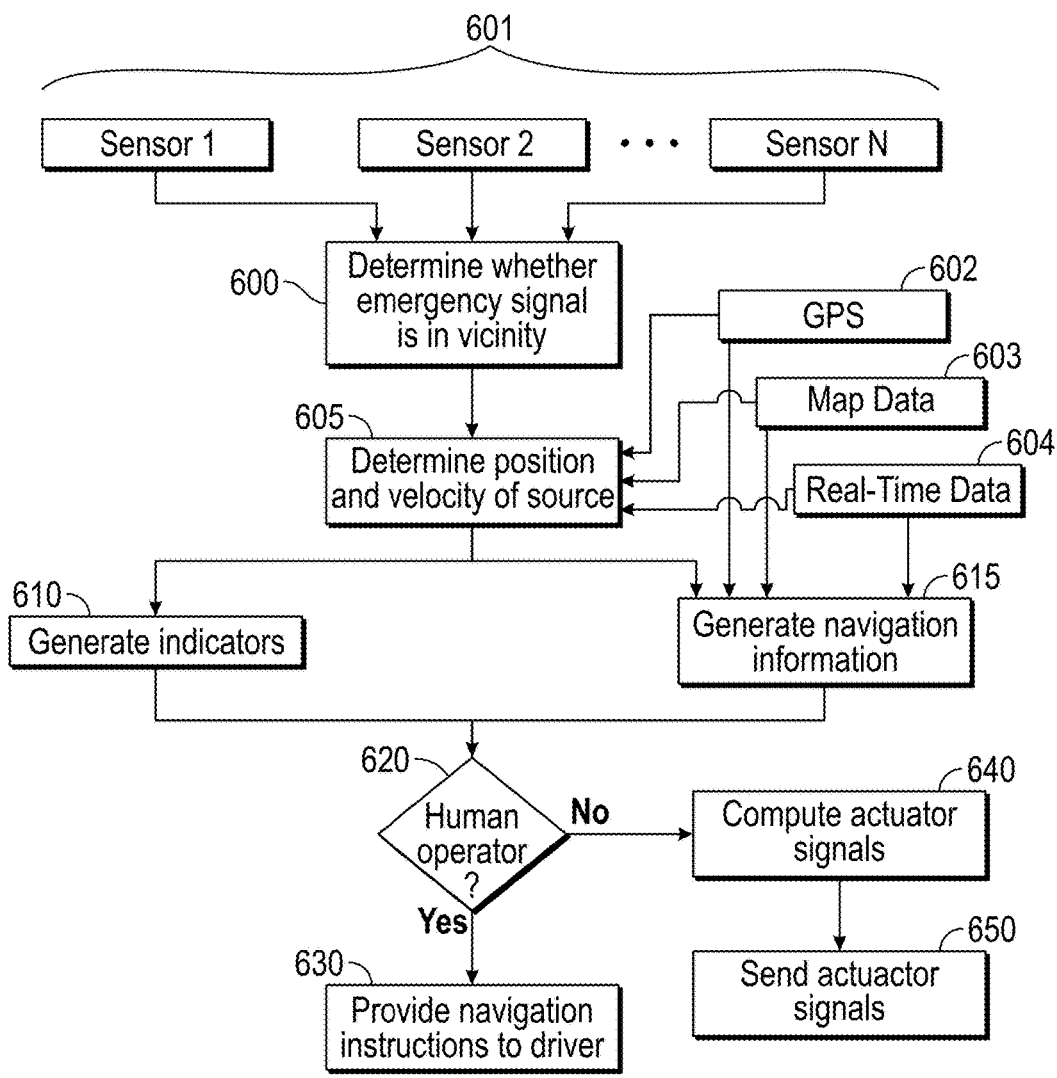

FIGS. 5 and 6 illustrate example processes for determining whether an emergency signal exists in the vicinity of a vehicle, and if an emergency signal so exists, determining how to generate output signals in response. In FIG. 5, the example process determines at stage 500 using one or more sensors 501 whether an emergency signal is present in the vicinity of the vehicle. If so, the process at stage 510 generates one or more output signals in response.

FIG. 6 shows an example process that incorporates several features discussed above. The example process at stage 600 determines, using one or more sensors 601, whether an emergency signal is present in the vicinity of the vehicle. If so, the example process at stage 605 determines the position and velocity of the source of the emergency signal using onboard GPS receiver 602, map data 603, and real-time data 604 (such as real-time traffic data or emergency broadcast information). The example process at stage 610 generates output signals comprising indicator signals such as audio, visual, or tactile indicators identifying to a vehicle occupant the position and velocity of the emergency signal. The example process at stage 615 generates output signals comprising navigation data using onboard GPS receiver 602, map data 603, and real-time data 604. At stage 620, the example process queries whether the vehicle is being operated by a human or whether it is being operated autonomously. If the vehicle is being operated by a human, the example process at stage 630 provides navigation instructions to the driver using the navigation data. If the vehicle is being operated autonomously, the example process at stage 640 computes actuator signals corresponding to the navigation data, and at stage 650 sends the actuator signals to actuator systems such as those shown as 130 in FIG. 1.

Figure 7A:
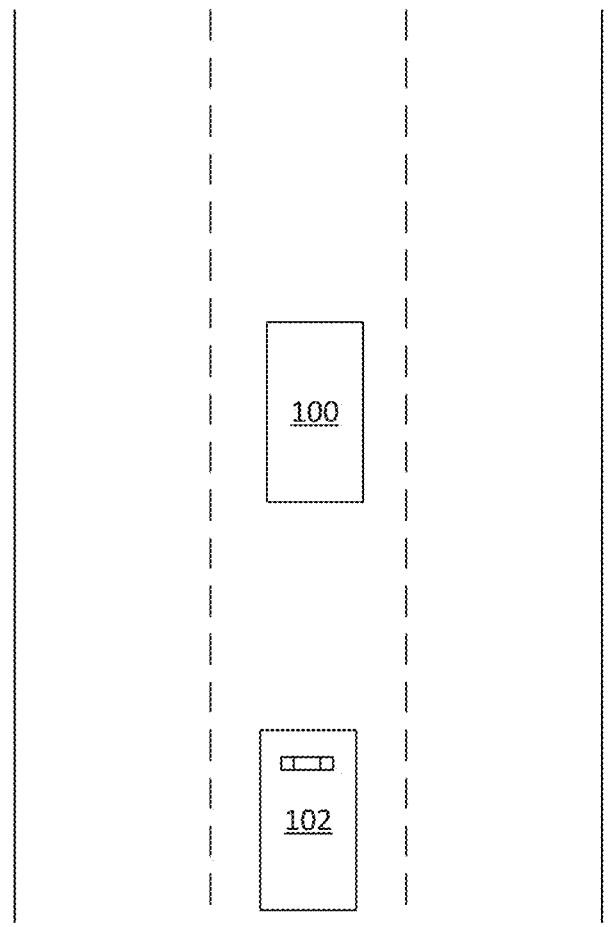
FIGS. 7A-7J illustrate a first vehicle automatically navigating in the presence of an emergency vehicle, according to examples of the disclosure.
Figure 7B:
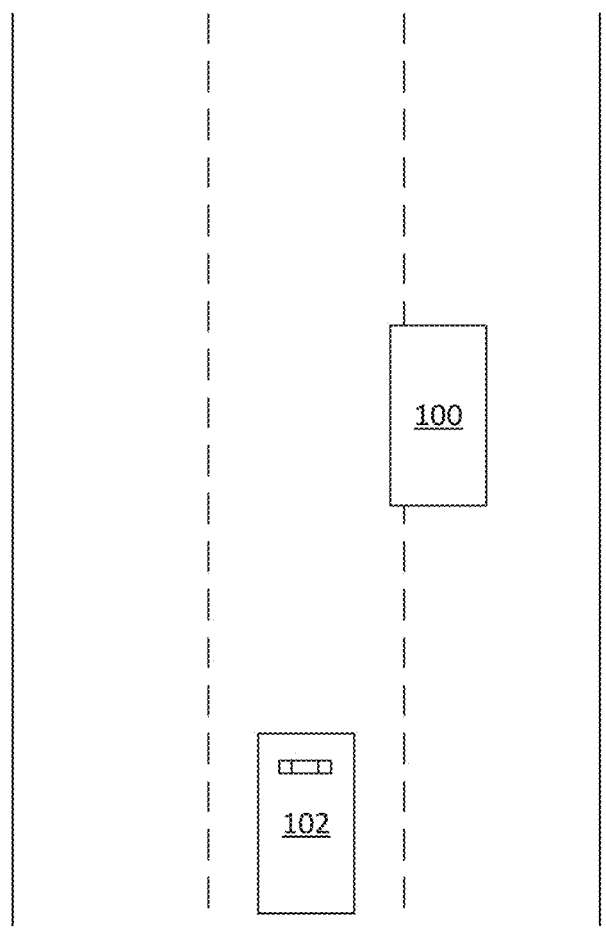

FIGS. 7A-7J illustrate a first vehicle 700 automatically navigating in the presence of an emergency vehicle 702 according to examples of the disclosure. In some examples, emergency vehicle 702 can broadcast a message periodically (e.g., every two seconds) indicating its presence and its location. First vehicle 700 can receive the message and compare the location of the first vehicle to the location of the emergency vehicle 702, as indicated by the message. For example, the first vehicle 700 can determine that it is in the same lane as the emergency vehicle 702 and/or that the emergency vehicle is behind the first vehicle, as illustrated in FIG. 7A. Then, the first vehicle 700 can take action appropriate when the emergency vehicle is in the same lane. For example, the first vehicle 700 can determine an appropriate trajectory for moving out of the lane (e.g., based on sensors such as cameras, radar, etc. that can detect the lane boundaries, objects, etc.), and then automatically manipulate its actuators to follow that trajectory into the adjacent lane, as illustrated in FIG. 7B.

Figure 7C:
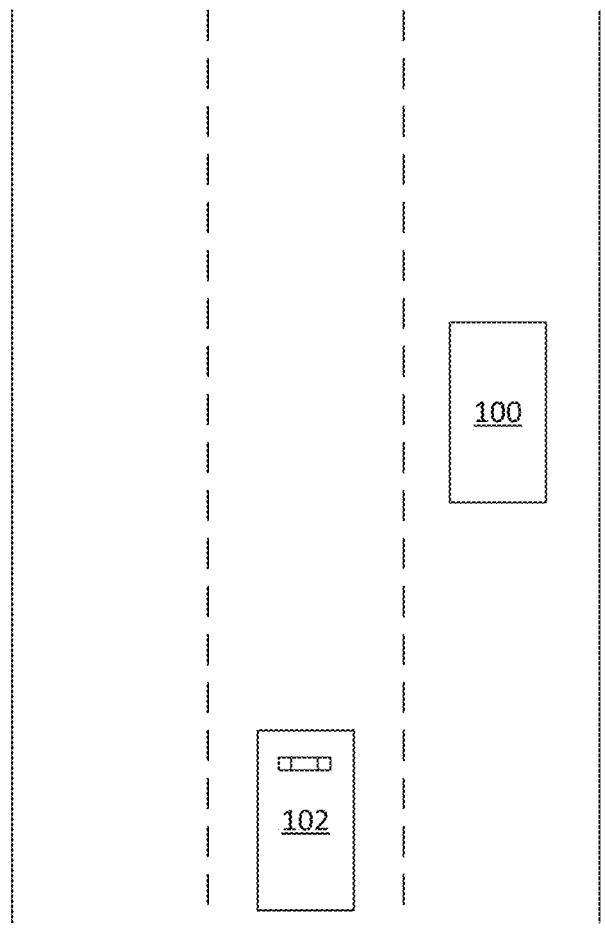
Figure 7D:
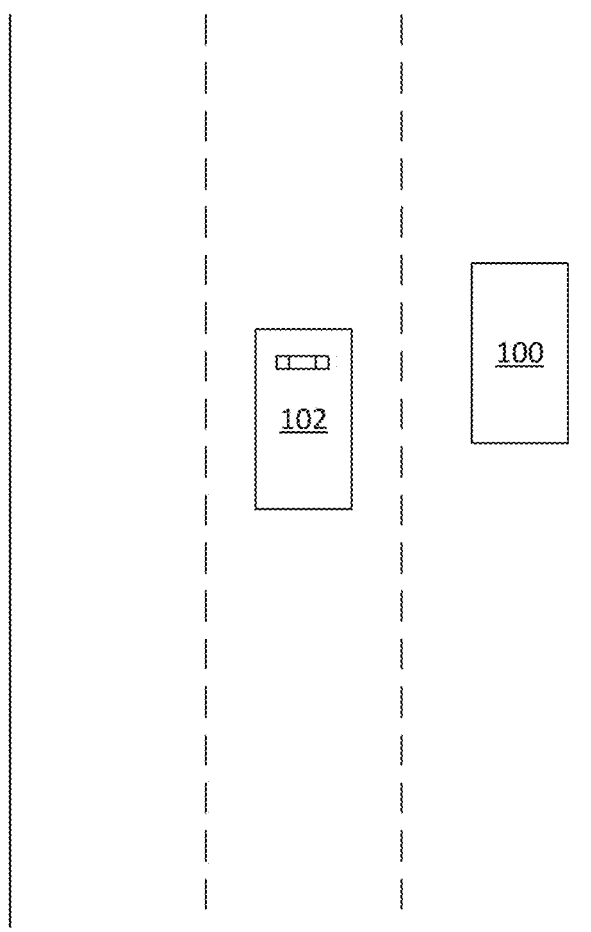

FIG. 7C illustrates the first vehicle 700 in a different lane than the emergency vehicle 702. If the first vehicle 700 determines that it is in a different lane the emergency vehicle, a different action may be appropriate. For example, instead of changing lanes, the first vehicle 700 may instead simply slow down, possibly to a stop, and/or move to the edge of the lane away from the emergency vehicle, as illustrated in FIG. 7D. In some examples, the first vehicle 700 may continue this behavior until the emergency vehicle 702 passes and is at a safe distance from the first vehicle. At that point, the first vehicle 700 may automatically speed up to a driving speed appropriate for the road being traveled (e.g., at the speed limit of the road, or at the speed of traffic on the road).

Figure 7E:
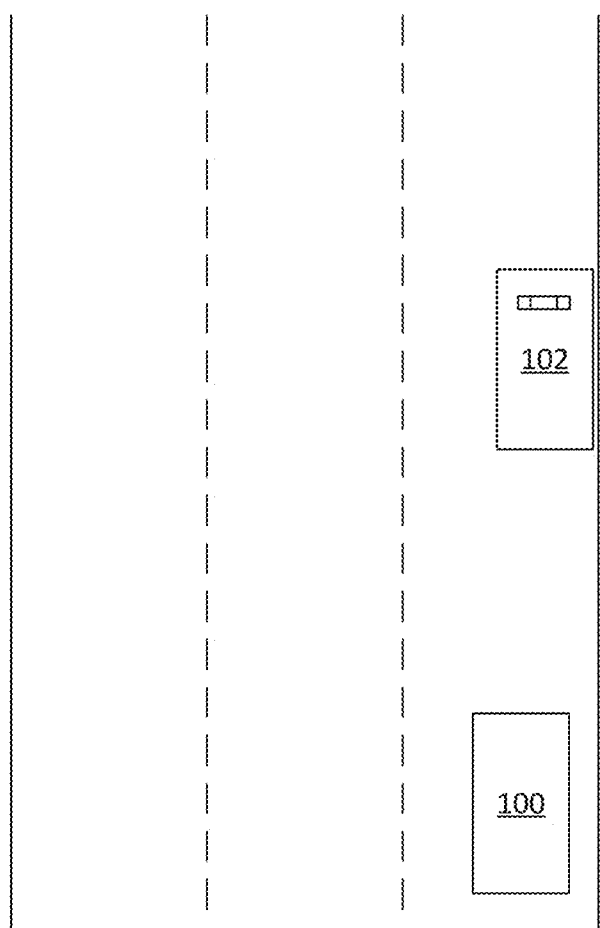
Figure 7F:
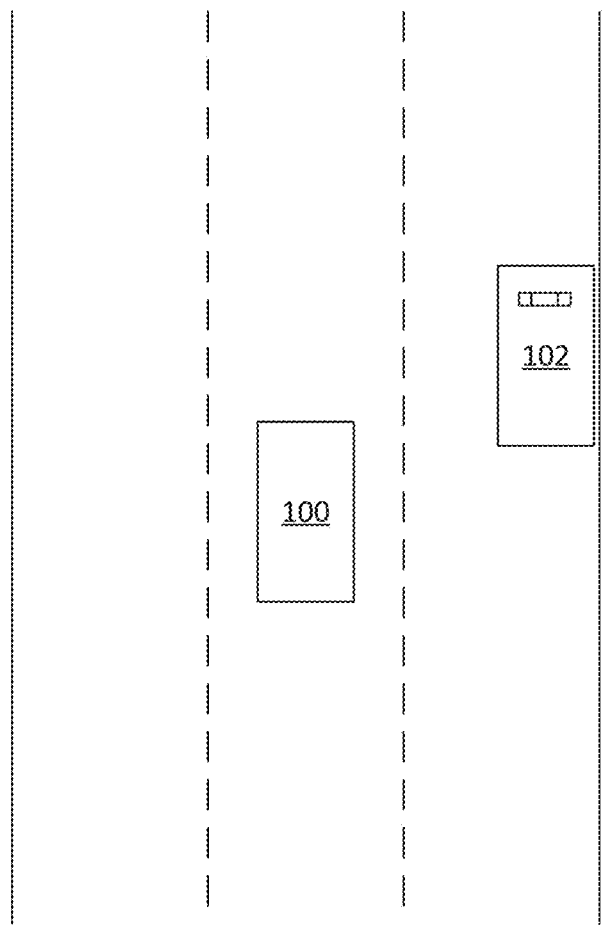

FIG. 7E illustrates the first vehicle 700 approaching a stopped emergency vehicle 702. If the first vehicle 700 determines that the emergency vehicle 702 is stopped, the first vehicle 700 can determine if a safe trajectory exists to pass the emergency vehicle. If there is a safe trajectory, the first vehicle 700 may automatically manipulate its actuators to follow the trajectory and safely pass the emergency vehicle (e.g., at a slow speed and in a different lane), as illustrated in FIG. 7F. If, however, there is no safe trajectory, the first vehicle 700 may slow to a stop and wait until a safe passing trajectory exists or for the emergency vehicle to leave the area. For example, on a two-lane road with oncoming traffic, it may not be safe to pass the emergency vehicle until the oncoming traffic subsides.

Figure 7G:
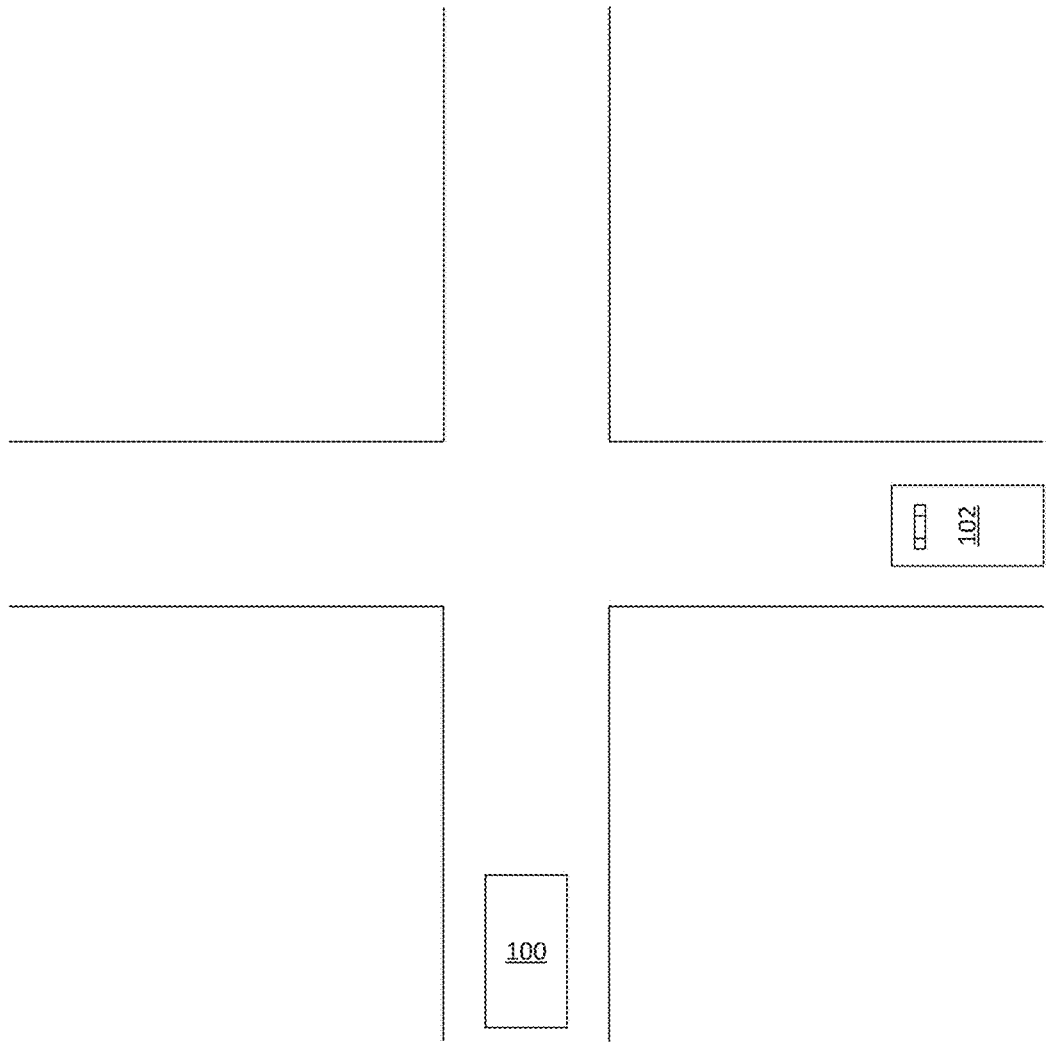
Figure 7H:
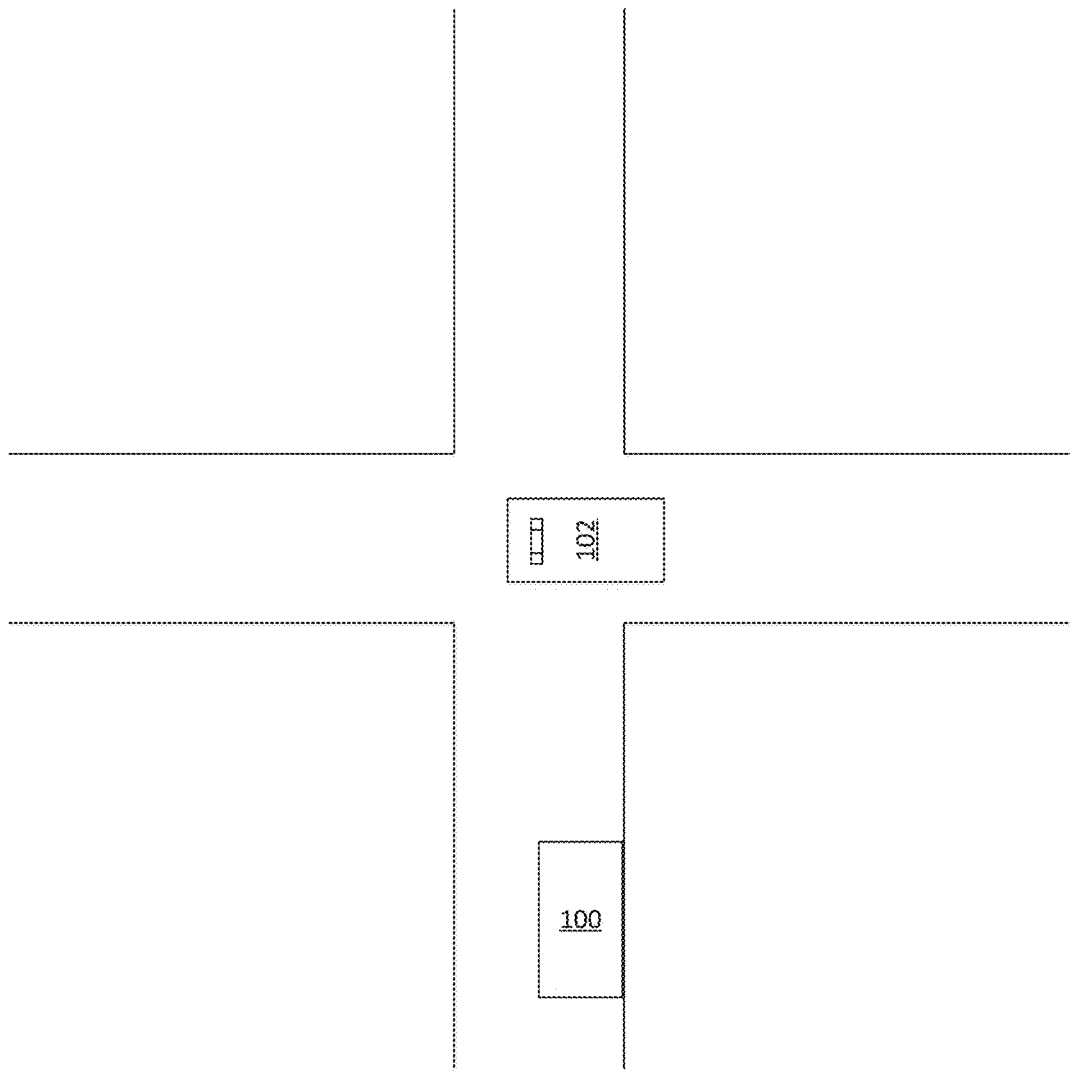
Figure 7I:
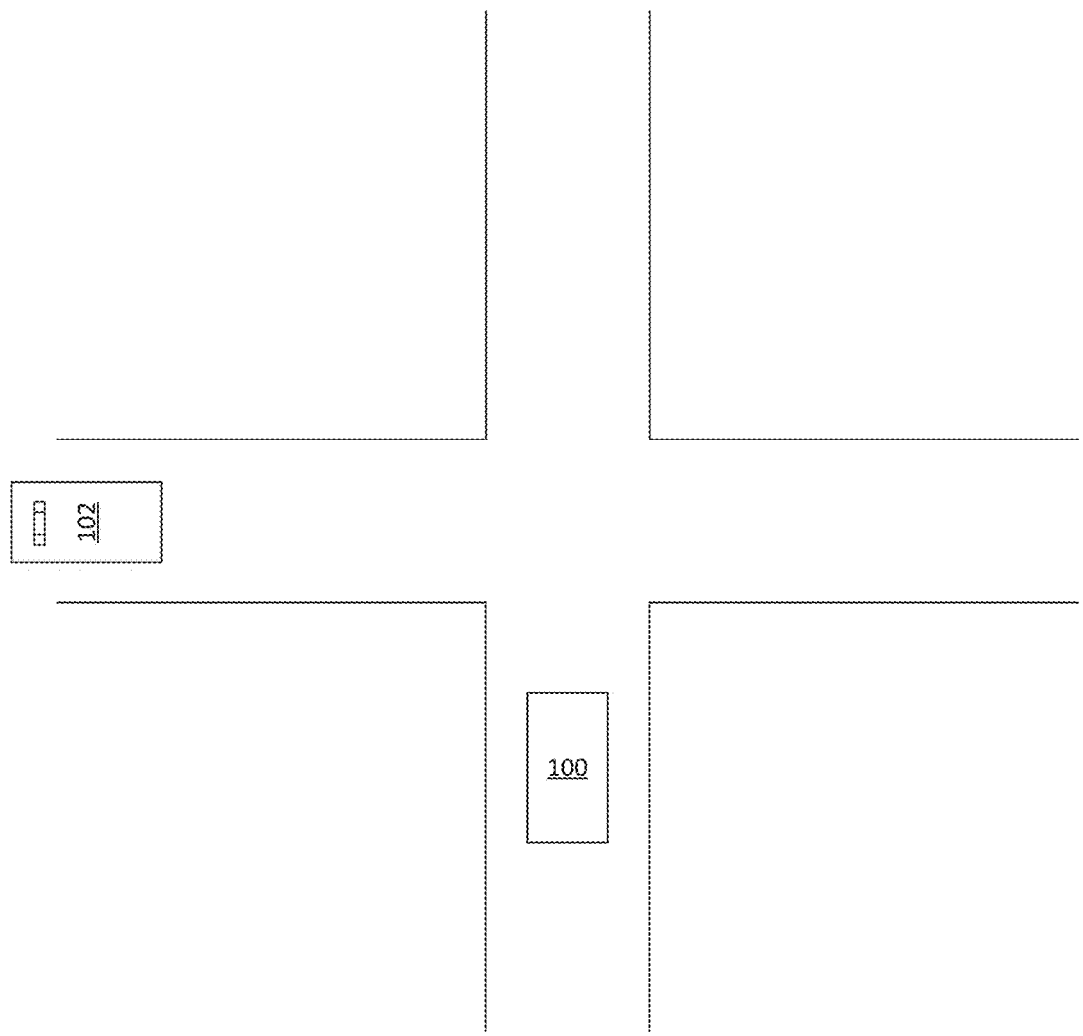

FIG. 7G illustrates the first vehicle 700 and the emergency vehicle 702 approaching an intersection from different roads. In some examples, the first vehicle 700 may recognize the presence of the emergency vehicle 702 without being able to determine the relative location of the emergency vehicle 702. For example, the message received by the first vehicle 700 may not include location information. In such a case, the first vehicle 700 may determine an appropriate action and carry out that action until the emergency vehicle 702 is out of range (e.g., the emergency vehicle is no longer detected, or it is determined it is a threshold distance away, etc.). For example, the first vehicle 700 may automatically slow down, stop, and/or pull over, as illustrated in FIG. 7H. Then, once the emergency vehicle 702 is out of range, the vehicle 700 may automatically continue on its way, as illustrated in FIG. 7I.

Figure 7J:
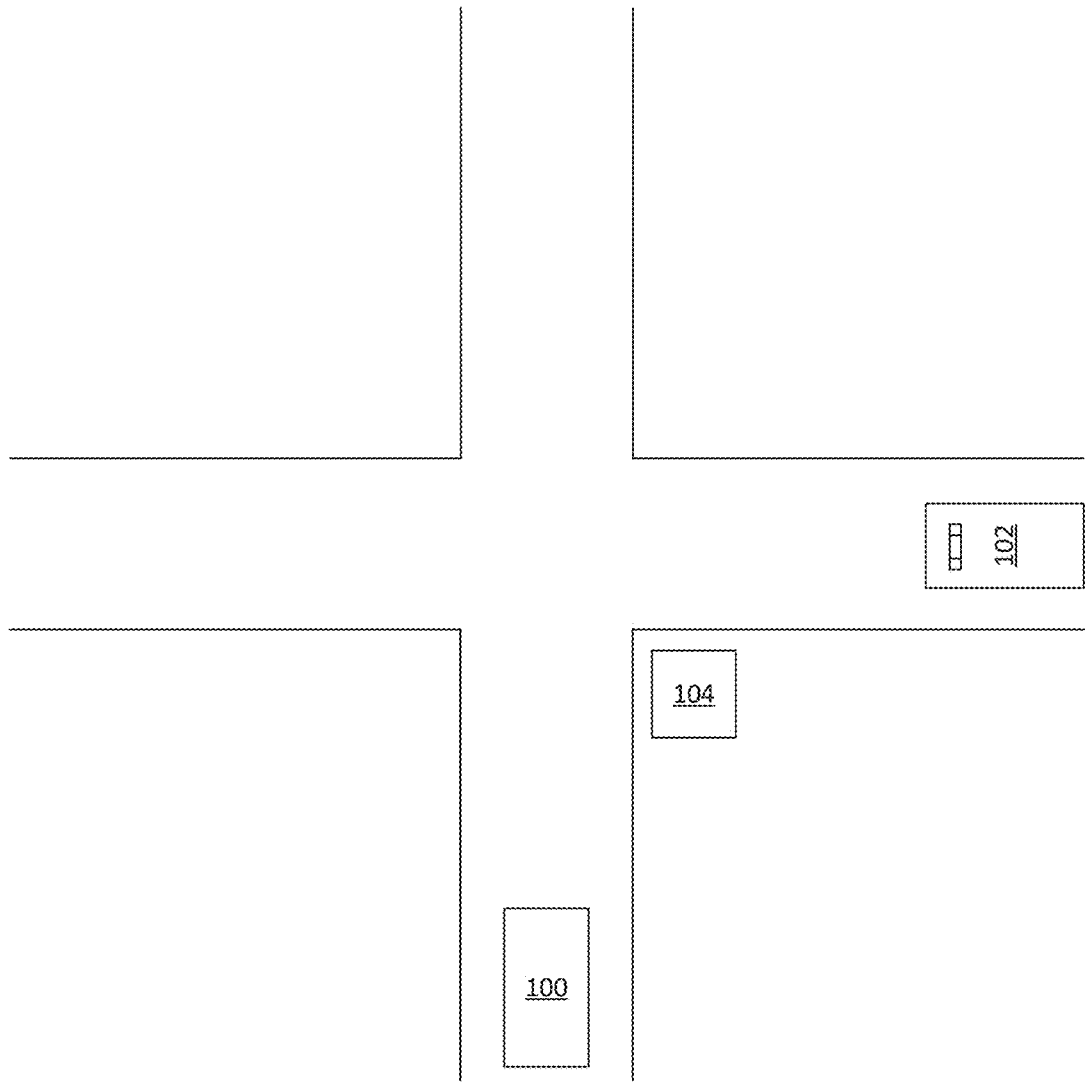

In some examples, the first vehicle 700 may receive a message indicating presence of the emergency vehicle 702 from infrastructure such as smart traffic light 704 illustrated in FIG. 7J. The smart traffic light 704 (or other smart infrastructure) may receive an indication of presence of the emergency vehicle 702 (e.g., a message transmitted by the emergency vehicle itself, sensors of the smart infrastructure may detect the sound or lights of the emergency vehicle (e.g., the sirens and/or the flashing lights), or a remote server may send emergency vehicle information to the infrastructure), and then the smart traffic light may in turn broadcast a message to nearby vehicles indicating presence of the emergency vehicle.

Figure 8:
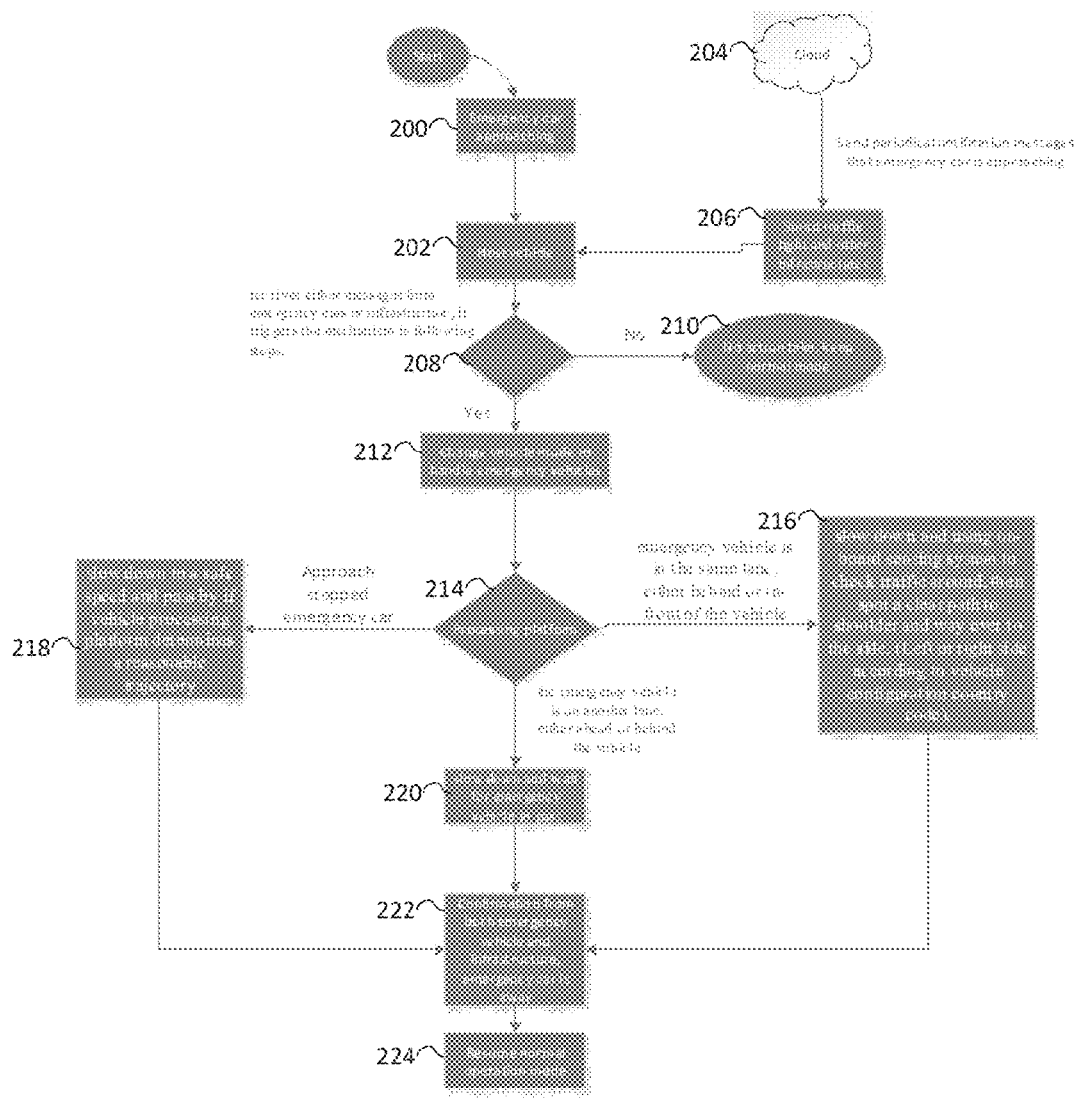
FIG. 8 illustrates an exemplary method of navigating a first vehicle in the presence of an emergency vehicle, according to examples of the disclosure.

FIG. 8 illustrates an exemplary method of navigating a first vehicle in the presence of an emergency vehicle according to examples of the disclosure. In some examples, an emergency vehicle (800) can be proximate to a first vehicle (e.g., host vehicle 802). As long as the first vehicle does not detect the presence of the emergency vehicle, it can take no alternate action and remain in a normal automatic driving mode (810). However, the first vehicle may receive (808), via communication hardware of the first vehicle, a message indicating presence of the emergency vehicle. In some examples, the message may be received from the emergency vehicle and may be transmitted via short range wireless communication to all vehicles within the transmission range of the emergency vehicle. In some examples, the message may be received from an infrastructure device (806) proximate to the first vehicle, such as a smart traffic light or other smart infrastructure. The message may originate from a remote server (e.g., cloud device 804) via a communication network such as the internet.

If the presence of the emergency vehicle is detected, the vehicle mode may be changed (812) to safely navigate in the presence of the emergency vehicle. One or more processors (814) of the first vehicle may determine a relative location of the emergency vehicle and take appropriate action in light of the relative location. In some examples, the received message can include a location of the emergency vehicle, and the relative location of the emergency vehicle can be determined based on the location of the emergency vehicle. In addition, the first vehicle can determine, using a location sensor of the first vehicle, a location of the first vehicle, and the relative location can be determined by comparing the location of the first vehicle to the location of the emergency vehicle. For example, it can be determined that the first vehicle and the emergency vehicle are in the same lane of a road, or it can be determined that the first vehicle and the emergency vehicle are in different lanes of the same road, among other possibilities.

In some examples, the first vehicle may sense, using one or more sensors of the first vehicle, one or more of sound and light of the emergency vehicle, and the relative location of the emergency vehicle may be determined based on sensing one or more of sound and light of the emergency vehicle. For example, directional sensors can determine relative location based on the magnitude of sensed sound/light in each direction.

In accordance with the relative location of the emergency vehicle being a same lane as the vehicle, the first vehicle may automatically manipulate actuators of the first vehicle to move the first vehicle out of the same lane as the emergency vehicle. In some examples, the first vehicle may determine a safe trajectory for movement based on sensors of the first vehicle. The first vehicle may receive information from the one or more sensors, and, based on the information from the one or more sensors, calculate a trajectory for avoiding the emergency vehicle. Then, the actuators of the first vehicle may be automatically manipulated according to the calculated trajectory for avoiding the emergency vehicle. For example, the first vehicle may slow down (816), and use the on-board sensing system to check nearby traffic, and then move along a clear path to the shoulder on the side of the road. In some examples, the appropriate side of the road to pull over may be selected based on a predetermined country code (e.g., right side in North America, left side in Great Britain).

In accordance with the relative location of the emergency vehicle being a different lane than the vehicle, the first vehicle may automatically manipulate the actuators of the first vehicle to reduce a speed of the first vehicle (820). In some examples, the speed may be reduced until the first vehicle has come to a complete stop.

In some examples, the vehicle may continue with reduced speed until the emergency vehicle is out of a threshold range of the first vehicle. For example, the first vehicle may determine a distance between the first vehicle and the emergency vehicle and compare that distance to the threshold range. In some examples, the first vehicle may sense one or more of sound and light of the emergency vehicle and determine that the sensed sound/light falls below a sensing threshold (e.g., indicating the emergency vehicle has moved out of the threshold range of the first vehicle). In some examples, determining the emergency vehicle is out of the threshold range of the first vehicle may include determining that a time elapsed since receipt of a message indicating presence of the emergency vehicle exceeds a threshold time (e.g., if no new message is received indicating presence of the emergency vehicle, it may be assumed that the emergency vehicle is no longer present).

In some examples, the first vehicle may determine that the emergency vehicle is stopped. In response to determining the emergency vehicle has stopped, the first vehicle may determine whether a safe trajectory exists for passing the emergency vehicle. In accordance with existence of a safe trajectory for passing the emergency vehicle, the first vehicle may manipulate the actuators of the first vehicle to safely pass the emergency vehicle (818). In accordance with no existence of a safe trajectory for passing the emergency vehicle, the first vehicle may manipulate the actuators of the first vehicle to slow/stop the first vehicle until a safe trajectory exists for passing the emergency vehicle. For example, the trajectory may be reassessed periodically until a safe trajectory can be determined and executed.

In some examples, the first vehicle may receive confirmation (822) from the emergency vehicle and/or the infrastructure that the emergency vehicle is no longer present. In response, the first vehicle may resume (824) a normal automatic driving mode.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method of navigating a first vehicle in presence of an emergency vehicle, the method comprising:
   receiving, via communication hardware of the first vehicle, a message indicating presence of the emergency vehicle;
   determining a relative location of the emergency vehicle;
   in accordance with the relative location of the emergency vehicle being a same lane as the vehicle, automatically manipulating actuators of the first vehicle to move the first vehicle out of the same lane as the emergency vehicle; and
   in accordance with the relative location of the emergency vehicle being a different lane than the vehicle, automatically manipulating the actuators of the first vehicle to reduce a speed of the first vehicle.

2. The method of claim 1, the method further comprising:
   determining the emergency vehicle is out of a threshold range of the first vehicle;
   wherein the speed of the first vehicle is reduced until the emergency vehicle is out of the threshold range of the first vehicle.

3. The method of claim 2, wherein determining the emergency vehicle is out of the threshold range of the first vehicle includes comparing the threshold range to a distance between the first vehicle and the emergency vehicle.

4. The method of claim 2, wherein determining the emergency vehicle is out of the threshold range of the first vehicle includes:
   sensing, using one or more sensors of the first vehicle, one or more of sound and light of the emergency vehicle; and
   determining that the sensed one or more of sound and light falls below a sensing threshold.

5. The method of claim 2, wherein determining the emergency vehicle is out of the threshold range of the first vehicle includes determining that a time elapsed since receipt of a message indicating presence of the emergency vehicle exceeds a threshold time.

6. The method of claim 1, wherein the message is received from the emergency vehicle.

7. The method of claim 1, wherein the message is received from an infrastructure device proximate to the first vehicle.

8. The method of claim 1, wherein the message is received from a remote server via a communication network.

9. The method of claim 1, the method further comprising:
   receiving information from one or more sensors of the first vehicle; and
   based on the information from the one or more sensors, calculating a trajectory for avoiding the emergency vehicle;
   wherein the actuators of the first vehicle are automatically manipulated according to the calculated trajectory for avoiding the emergency vehicle.

10. The method of claim 1, wherein the message includes a location of the emergency vehicle, and the relative location of the emergency vehicle is determined based on the location of the emergency vehicle.

11. The method of claim 1, the method further comprising:
    determining, using a location sensor of the first vehicle, a location of the first vehicle, wherein the relative location of the emergency vehicle is determined based on the location of the first vehicle.

12. The method of claim 1, the method further comprising:
    sensing, using one or more sensors of the first vehicle, one or more of sound and light of the emergency vehicle, wherein the relative location of the emergency vehicle is determined based on sensing one or more of sound and light of the emergency vehicle.

13. The method of claim 1, the method further comprising:
    determining the emergency vehicle is stopped;
    in response to determining the emergency vehicle has stopped, determining whether a safe trajectory exists for passing the emergency vehicle;
    in accordance with existence of a safe trajectory for passing the emergency vehicle, manipulating the actuators of the first vehicle to safely pass the emergency vehicle; and
    in accordance with no existence of a safe trajectory for passing the emergency vehicle, manipulating the actuators of the first vehicle to stop the first vehicle until a safe trajectory exists for passing the emergency vehicle.

14. A method of navigating a first vehicle in presence of an emergency vehicle, the method comprising:
    receiving, via communication hardware of the first vehicle, a message indicating presence of the emergency vehicle;
    determining a relative location of the emergency vehicle;
    in accordance with the relative location of the emergency vehicle being a same lane as the vehicle, automatically manipulating actuators of the first vehicle to move the first vehicle out of the same lane as the emergency vehicle; and
    in accordance with the relative location of the emergency vehicle being a different lane than the vehicle, automatically manipulating the actuators of the first vehicle to reduce a speed of the first vehicle.

15. The method of claim 14, the method further comprising:
    determining the emergency vehicle is out of a threshold range of the first vehicle;
    wherein the speed of the first vehicle is reduced until the emergency vehicle is out of the threshold range of the first vehicle.

16. The method of claim 15, wherein determining the emergency vehicle is out of the threshold range of the first vehicle includes comparing the threshold range to a distance between the first vehicle and the emergency vehicle.

17. The method of claim 15, wherein determining the emergency vehicle is out of the threshold range of the first vehicle includes:
    sensing, using one or more sensors of the first vehicle, one or more of sound and light of the emergency vehicle; and
    determining that the sensed one or more of sound and light falls below a sensing threshold.

18. The method of claim 15, wherein determining the emergency vehicle is out of the threshold range of the first vehicle includes determining that a time elapsed since receipt of a message indicating presence of the emergency vehicle exceeds a threshold time.

19. The method of claim 14, the method further comprising:
   receiving information from one or more sensors of the first vehicle; and
   based on the information from the one or more sensors, calculating a trajectory for avoiding the emergency vehicle;
   wherein the actuators of the first vehicle are automatically manipulated according to the calculated trajectory for avoiding the emergency vehicle.

20. A first vehicle, comprising:
   one or more processors;
   communication hardware;
   actuators; and
   a memory storing instructions, which, when executed by the one or more processors, cause the vehicle to perform a method of recognizing a driving pattern of the vehicle, the method comprising:
   receiving, via the communication hardware of the first vehicle, a message indicating presence of the emergency vehicle;
   determining a relative location of the emergency vehicle;
   in accordance with the relative location of the emergency vehicle being a same lane as the vehicle, automatically manipulating the actuators of the first vehicle to move the first vehicle out of the same lane as the emergency vehicle; and
   in accordance with the relative location of the emergency vehicle being a different lane than the vehicle, automatically manipulating the actuators of the first vehicle to reduce a speed of the first vehicle.

* * * * *